(12) United States Patent
Kubiak et al.

(10) Patent No.: US 11,439,549 B2
(45) Date of Patent: *Sep. 13, 2022

(54) CASTOR BASE WITH LOAD SENSOR

(71) Applicant: NOA Medical Industries, Inc., Washington, MO (US)

(72) Inventors: Craig P. Kubiak, Washington, MO (US); Ron Hartge, Washington, MO (US)

(73) Assignee: NOA Medical Industries, Inc., Washington, MO (US)

( * ) Notice: Subject to any disclaimer, the term of this patent is extended or adjusted under 35 U.S.C. 154(b) by 282 days.

This patent is subject to a terminal disclaimer.

(21) Appl. No.: 16/741,182

(22) Filed: Jan. 13, 2020

(65) Prior Publication Data

US 2020/0170859 A1 Jun. 4, 2020

Related U.S. Application Data

(63) Continuation of application No. 15/470,437, filed on Mar. 27, 2017, now Pat. No. 10,555,852.

(60) Provisional application No. 62/314,158, filed on Mar. 28, 2016.

(51) Int. Cl.
| | |
|---|---|
| *A61G 7/05* | (2006.01) |
| *A61G 7/012* | (2006.01) |
| *G01G 19/44* | (2006.01) |
| *A61G 7/005* | (2006.01) |

(52) U.S. Cl.
CPC ............ *A61G 7/0527* (2016.11); *A61G 7/005* (2013.01); *A61G 7/012* (2013.01); *A61G 7/0524* (2016.11); *G01G 19/445* (2013.01); *A61G 2203/12* (2013.01); *A61G 2203/20* (2013.01); *A61G 2203/32* (2013.01); *A61G 2203/44* (2013.01)

(58) Field of Classification Search
CPC ...... A61G 1/02; A61G 1/0212; A61G 1/0237; A61G 1/0562; A61G 7/005; A61G 7/012; A61G 7/0527; A61G 2203/32; A61G 2203/44; G01G 19/445
See application file for complete search history.

(56) References Cited

U.S. PATENT DOCUMENTS

| | | | | |
|---|---|---|---|---|
| 7,176,391 | B2 * | 2/2007 | Metz | ............. A61G 7/012 177/144 |
| 7,282,652 | B1 | 10/2007 | Johnson et al. | |
| 7,335,839 | B2 * | 2/2008 | Metz | ............. A61G 7/012 177/144 |
| 8,191,940 | B2 * | 6/2012 | Bly | ............. A61G 7/05 292/163 |
| 8,590,073 | B2 | 11/2013 | Bly et al. | |

(Continued)

*Primary Examiner* — Robert G Santos
(74) *Attorney, Agent, or Firm* — Lewis Rice LLC

(57) ABSTRACT

Systems and methods for a load sensing system that determines a mass on a bed. The systems generally are in the form of a castor base, particularly one that can be used as part of an adjustable hospital bed. The load sensing system serves to determine the mass of any object or objects (typically a human or animal patient) which is placed on the bed by having the mass create a force on lever arms of a plurality of load cells in the castor base. The load sensing systems are designed to work without hindering the adjustable functionality of the bed and can accurately determine mass (weight) at any position of the bed, and potentially even while the bed is adjusting between positions.

7 Claims, 6 Drawing Sheets

(56) References Cited

U.S. PATENT DOCUMENTS

| | | | |
|---|---|---|---|
| 8,990,982 B2* | 3/2015 | Bly | A61G 7/08 |
| | | | 5/510 |
| 9,107,781 B1 | 8/2015 | Edgerton | |
| 9,381,126 B2* | 7/2016 | Bly | A61G 7/002 |
| 9,629,767 B2* | 4/2017 | Li | A61G 7/018 |
| 9,994,072 B2 | 6/2018 | Lyon | |
| 10,555,852 B2* | 2/2020 | Kubiak | A61G 7/0527 |
| 10,787,034 B2* | 9/2020 | Lyon | B60B 33/0092 |
| 2006/0059814 A1 | 3/2006 | Metz et al. | |
| 2007/0107948 A1* | 5/2007 | Metz | A61G 7/012 |
| | | | 177/144 |
| 2009/0100598 A1* | 4/2009 | Bly | A61G 7/0528 |
| | | | 5/510 |
| 2012/0233779 A1* | 9/2012 | Bly | F16H 35/14 |
| | | | 5/510 |
| 2014/0245535 A1* | 9/2014 | Bly | F16H 35/14 |
| | | | 5/510 |
| 2014/0352060 A1 | 12/2014 | Hirose | |
| 2015/0033472 A1 | 2/2015 | Li | |
| 2015/0182401 A1* | 7/2015 | Bly | A61G 7/08 |
| | | | 280/766.1 |
| 2015/0300872 A1 | 10/2015 | Hirose et al. | |
| 2016/0074265 A1* | 3/2016 | Lyon | B60B 33/021 |
| | | | 5/600 |
| 2016/0081592 A1 | 3/2016 | Ishikawa et al. | |
| 2017/0312154 A1* | 11/2017 | Kubiak | A61G 7/005 |
| 2019/0001747 A1* | 1/2019 | Lyon | B60B 33/0092 |
| 2020/0170859 A1* | 6/2020 | Kubiak | A61G 7/0524 |

\* cited by examiner

CASTOR BASE WITH LOAD SENSOR

CROSS REFERENCE TO RELATED APPLICATION(S)

This application is Continuation of U.S. Utility patent application Ser. No. 15/470,437, filed Mar. 27, 2017 and now U.S. Pat. No. 10,555,852, which claims the benefit of U.S. Provisional Patent Application Ser. No. 62/314,158, filed Mar. 28, 2016. The entire disclosure of all the above documents is herein incorporated by reference.

BACKGROUND

1. Field of the Invention

This disclosure is related to the field of load sensing in lifts. In particular, it is for the positioning of a load sensor in the castor base of an adjustable hospital bed.

2. Description of the Related Art

Within a hospital, the bed is ubiquitous. It is generally the most major piece of furniture in every hospital room and is the one primarily utilized by the patient. The reasons are clear. Patients in hospital often need to be transported by others, and often need to be transported when they are under the effects or anesthesia, asleep, or otherwise incapacitated.

Hospital beds are, therefore, often required to have much more functionality than traditional beds. They generally need to be on wheels to be easily moveable within the hospital. They also commonly need to be adjustable in a variety of different directions to allow patients that are unable to move themselves, and often lack even basic motor control, to be moved by others from and to the bed safely and to allow patients that may be awake and at least partially mobile to be comfortable in them both sleeping and performing other activities such as eating.

One element of interest for patients that are in the hospital is their weight (body mass). This can be relevant to determine the amount of certain medications they should be provided with, for other forms of treatment, and for general monitoring. However, when patients cannot stand or sit, they generally cannot utilize traditional scales which require them to position and hold their body on the sensing mechanism. Therefore, it is desirable to have weight sensing mechanisms which can be used by a patient that is unconscious and ideally can be used without them having to be moved any additional times. Traditionally, hospitals have utilized scales which are capable of having a bed or wheelchair rolled onto them for this purpose. However, this means that the patient has to be transported from the room to the scale and the scales may become a chokepoint in hospital procedures if they are needed by a large number of patients at the same time. These systems can also introduce errors if the mass of the bed, wheelchair, and any other ancillary objects thereon are not taken into account in the mass calculation. This can result in an inflated weight calculations which in turn may result in overmedication or other problems.

SUMMARY

Because of these and other problems in the art, described herein are systems and methods for a castor base, particularly one that can be used as part of an adjustable hospital bed, that includes a load sensing system. The load sensing system serves to determine the mass of any object or objects (typically a human or animal patient) which is placed on the bed. The load sensing systems are designed to work without hindering the adjustable functionality of the bed and can accurately determine mass (weight) at any position of the bed, and potentially even while the bed is adjusting between positions.

There are described herein, among other things, systems and methods for a load sensing system that determines a mass on a bed. The systems generally are in the form of a castor base that serves to determine the mass of any object or objects which is placed on the bed by having the mass create a force on lever arms of a plurality of load cells in the castor base.

There is described herein, among other things, an adjustable bed comprising; a main frame supporting a mattress; a lift connected to said main frame and having an axle spaced from said connection to said main frame; and a castor base rotationally connected to said axle, said castor base comprising: two auxiliary beams, each auxiliary beam supporting at least one castor; a load cell mounted to each of said auxiliary beams via a main housing and having a lever arm extending therefrom; wherein said lever arm is of generally cylindrical shape; and wherein a force applied to said lever arm in a direction generally perpendicular to a direction said lever arm extends from said main housing is detected by said load cell; and a bushing positioned on each of said lever arms to rotate about said lever arm without rotating said lever arm it is positioned on; wherein, said axle of said lift is connected to said bushing so that said axle can rotate relative to said castor base without rotating said lever arms; and wherein, placing a mass on said main frame creates a force on each said lever arm detected by said load cell.

In an embodiment, the bed is an adjustable hospital bed.

In an embodiment of the bed, the main frame includes at least one side panel;

In an embodiment, the bed further comprises a main beam interconnecting said auxiliary beams.

In an embodiment of the bed, the main beam is of generally "L" shape having two generally perpendicular arms and said axle rotates within said space defined by said two arms.

In an embodiment of the bed, each of said auxiliary beams includes two castors each of said two castors being arranged toward an opposing end of said auxiliary beam.

In an embodiment of the bed, wiring from each said load cell extends into said axle.

In an embodiment of the bed, each said load cell is electronically connected to a controller which also actuates said lift.

In an embodiment of the bed, the lift is a "Y" lift or a scissor lift.

In an embodiment of the bed, the bushings and said lever arms are positioned inside said axle.

There is also described herein, in an embodiment, an adjustable bed comprising: a main frame having a foot portion and a head portion and supporting a mattress; a foot lift connected to said foot portion and having an axle spaced from said connection to said main frame; a head lift connected to said head portion and having an axle spaced from said connection to said main frame; a foot castor base rotationally connected to said axle of said foot lift and a head castor base rotationally connected to said axle of said head lift, each of said foot castor base and said head castor base comprising: two auxiliary beams, each auxiliary beam supporting at least one castor; a load cell mounted to each of said auxiliary beams via a main housing and having a lever arm extending therefrom; wherein said lever arm is of generally cylindrical shape; and wherein a force applied to said lever arm in a direction generally perpendicular to a direction said lever arm extends from said main housing is detected by said load cell; and a bushing positioned on each of said lever arms to rotate about said lever arm without rotating said lever arm it is positioned on; wherein, said axle of said lift is connected to said bushing so that said axle can rotate relative to said castor base without rotating said lever arms; and wherein, placing a mass on said main frame creates a force on each said lever arm detected by said load cell.

In an embodiment of the bed, the foot lift and said head lift are configured to move independently of each other.

In an embodiment, the bed further comprises a main beam interconnecting said auxiliary beams within each castor base.

In an embodiment of the bed, the main beam is of generally "L" shape having two generally perpendicular arms and said axle rotates within said space defined by said two arms.

In an embodiment of the bed, each of said auxiliary beams includes two castors each of said two castors being arranged toward an opposing end of said auxiliary beam.

In an embodiment of the bed, the bushings and said lever arms on said foot castor base are positioned inside said axle attached to said foot castor base and said bushings and said lever arms on said head castor base are positioned inside said axle attached to said head castor base.

In an embodiment of the bed, wiring from each said load cell extends into said axle said lever arm is positioned within.

In an embodiment of the bed, electrical signals indicative of said force on each of said load cell are combined at a single controller to determine said mass.

DESCRIPTION OF PREFERRED EMBODIMENT(S)

Figure 1:
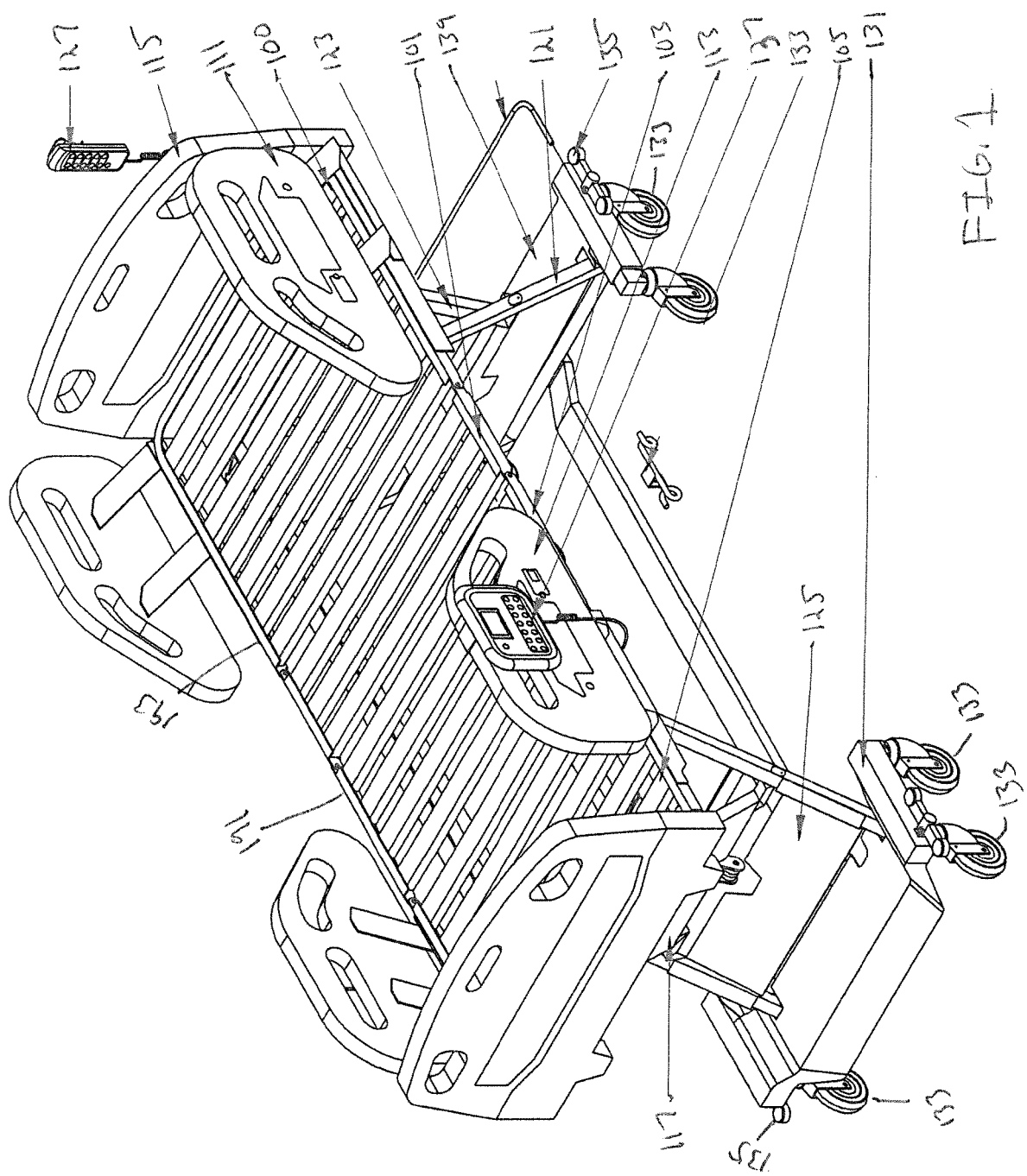
FIG. 1 shows an embodiment of an adjustable bed including an embodiment of a load sensing castor base.
Figure 2:
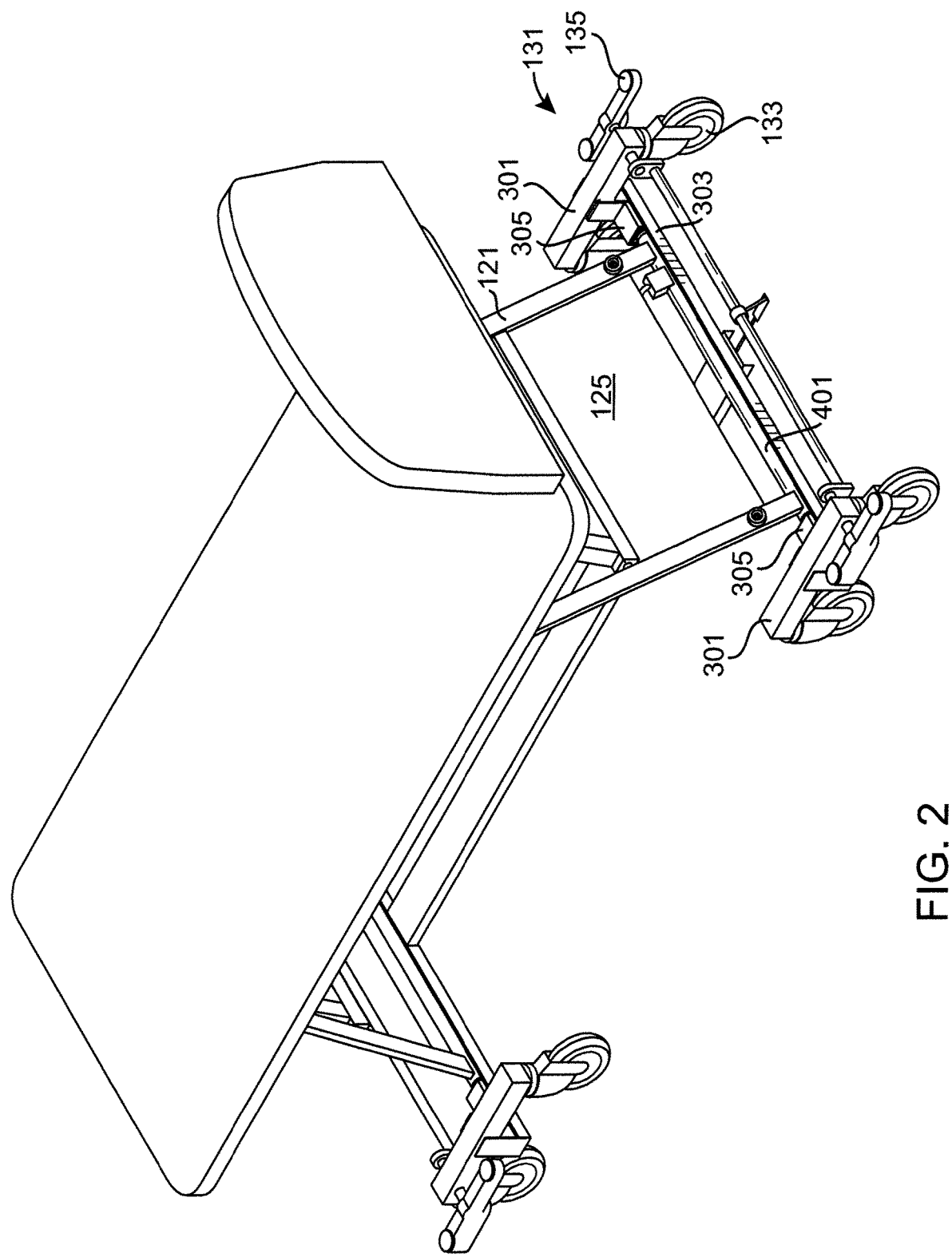
FIG. 2 shows an embodiment of an adjustable bed including a load sensing castor base with the protective cover removed so the rotational axle is visible.

FIG. 1 provides an embodiment of an adjustable bed (100) according to the present disclosure which includes an embodiment of a load sensing system. This type of bed (100) is exemplary of the types which can use or include a load sensing castor system and while the castor system is not limited to use in these types of beds (100), it is useful for illustrative purposes. Similar beds are also discussed in U.S. Pat. Nos. 8,845,264 and D661,122, the entire disclosures of which are herein incorporated by reference. Throughout this disclosure it will generally be discussed that the bed (100) is a bed for use in a hospital or other medical care facility as that is a common type of bed (100) where a load sensing system is desirable, but the present disclosure is not limited to this particular application.

The depicted bed (100) includes a main frame (101) which serves to support the mattress, linens, and other non-durable components of the bed as well as, ultimately, the patient. In the depicted embodiment, the main frame (101) is made up of an exterior frame (103), which includes various hinges for adjustability, and a plurality of slats (105) which serve as the primary weight bearing support. The main frame (101) will generally comprise two major portions, a foot portion (191) and a head portion (193). The bed (100) may also include a variety of hospital specific components such as side panels (111) and (113) to inhibit a patient from falling off the sides, and a head board (115) and footboard (117).

The depicted bed (100) is adjustable so that the foot portion (191), head portion (193), or any combination thereof can be moved upwards or downward. The adjustment is generally accomplished by a pair of "Y" or scissor lifts (125) one of which is arranged at each of the head portion (193) and foot portion (191) of the bed (100). The depicted lifts (125) each comprise a main raise arm (121) and a secondary raise arm (123) which serve to both adjust the height of the specific portion, and to adjust the relative angle to provide for the flexibility in movement. Adjustment may be controlled by a controller (127) which serves to power the various actuators such as, but not limited to, pneumatic or hydraulic cylinders, motors, worm drives, and related devices and combinations thereof.

To allow the bed to be rolled, the lifts (125) are generally rotationally attached to two castor bases (131) one at the head portion (193) and one at the foot portion (191) of the bed (100) via an axle (401). In the depicted embodiment, each of the two castor bases (131) includes four castors (133) which contact the floor upon which the bed (100) is placed and allow it to be rolled, but this particular number of castors (133) is by no means limiting. Some or all of the castors (133) may be able to be locked into position by actuation of a foot lock (135).

Figure 6:
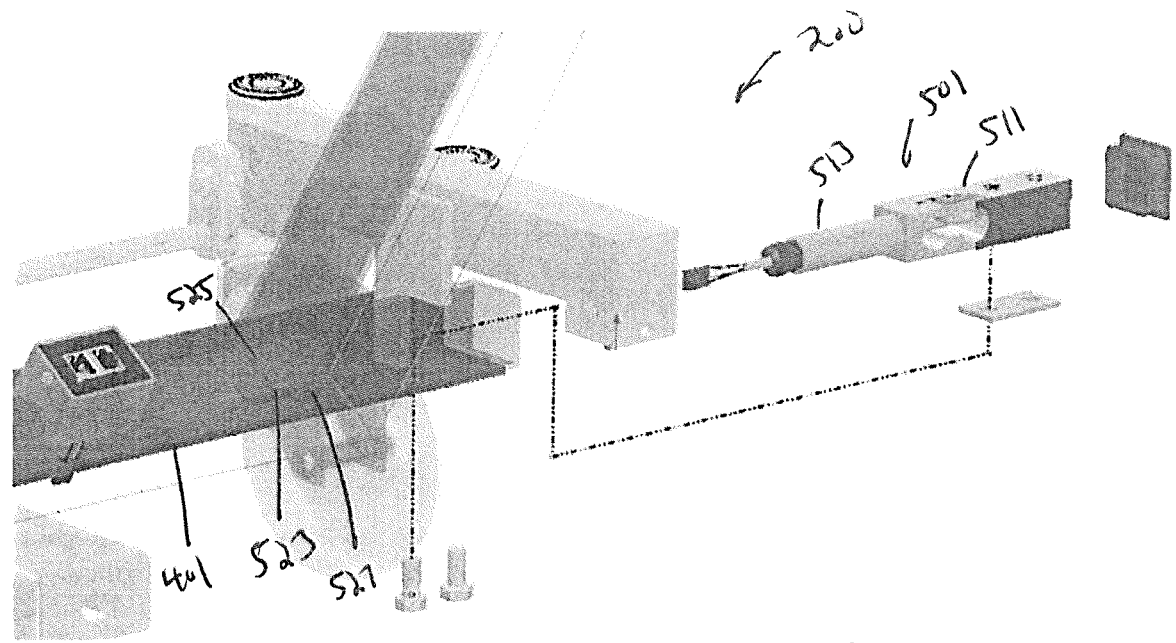
FIG. 6 shows an exploded view of a portion of an embodiment of a load sensing castor base showing one of the four load sensors.
Figure 7:
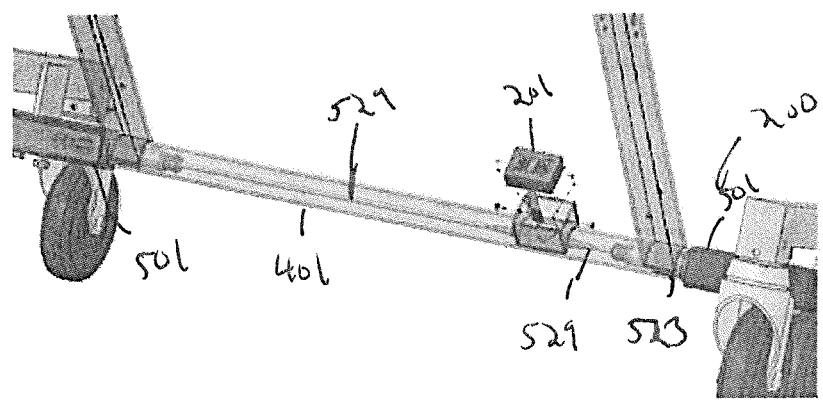
FIG. 7 shows a partially transparent view of an embodiment of a load sensing castor base showing two of the load sensors.

A load sensor (200) is generally located within each side of each castor base (131) or at the four "corners" of the bed. Thus, there is generally a load sensor (200) at each set of two castors (133) with two on each side of the bed (100). Various of the load sensors (200) are best seen in FIGS. 6 and 7, but portions are visible in FIGS. 2-5. The output of the load sensors (200) will generally be transmitted to a display (137) which may also provide controls for the load system, and possibly other components of the bed (100). In the depicted embodiment, transmittal is via a wire harness (201).

As shown in FIG. 1, the connection of the lifts (125) to the castor base (131) is generally covered by a guard (139) which serves to cover certain moving components and prevent inadvertent interaction with the connection between the lift arms (125) and the castor base (131). In the depictions of FIGS. 2 through 5, the guard (139) has been removed to provide a better illustration of the internal components.

Figure 3:
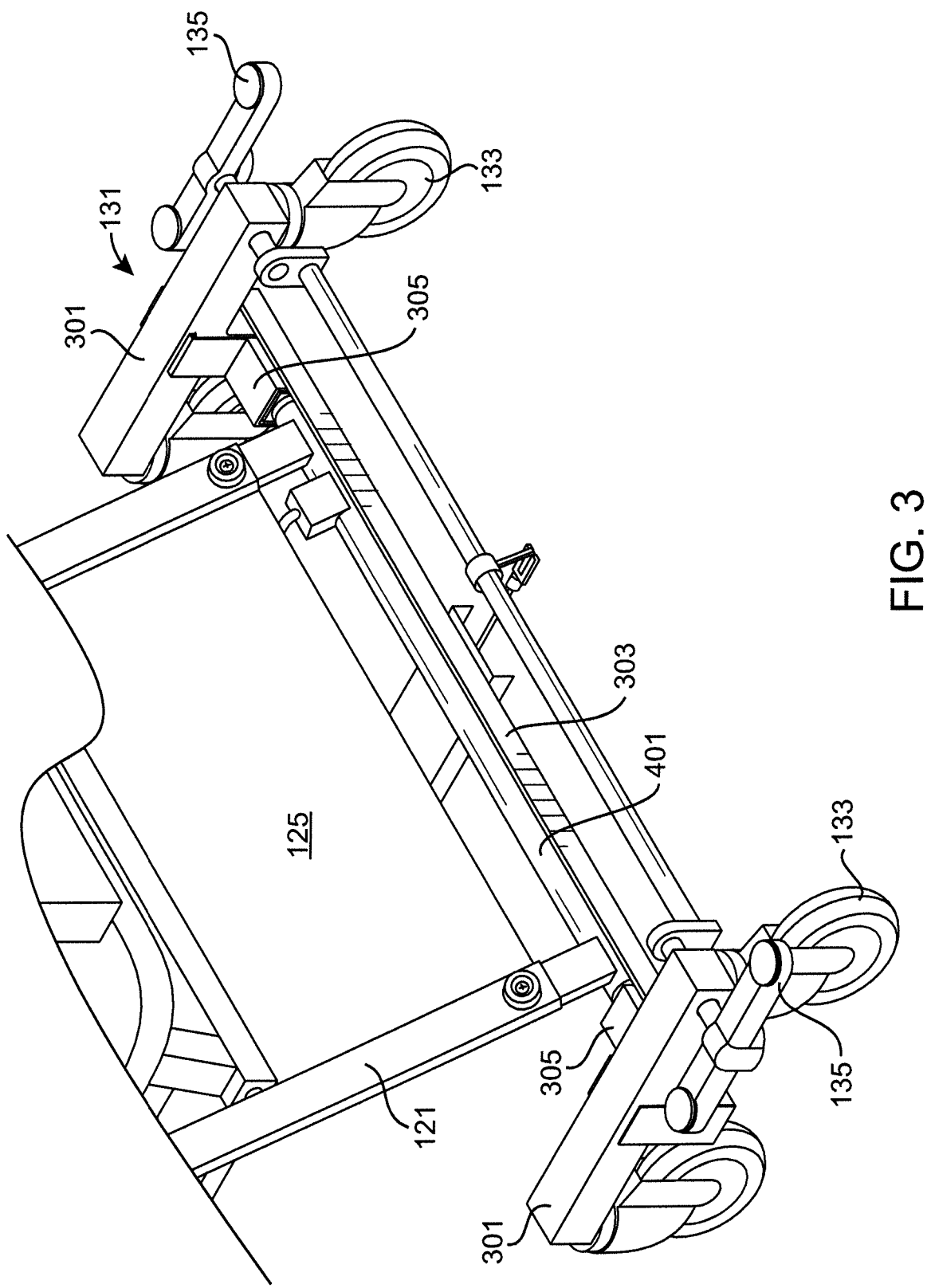
FIG. 3 shows a closer in view of the castor base of the adjustable bed of FIG. 2.

To provide for structure, the castor base (131) is generally formed of a main beam (303) running the width of the bed (100) and two auxiliary beams (301) in a generally "I" shape except that the auxiliary beams (301) are not co-planar with the main beam (303) and are generally perpendicular to the main beam (303). The castors (133) extend generally downward from the outside points of the "I". The main beam (303) is generally primarily of a planar shape or "L" shape having two generally perpendicular arms to allow for the axle (401) of the lift (125) to rotate in close proximity to the main beam (303) without contact. In the "L" shape depicted, the axle (125) will generally rotate within the space defined by the arms as best shown in FIG. 3 The main beam (303) also includes two end portions (305) toward both terminal ends of the main beam (303). The end portions (305) are each formed of generally hollow tubes which are commonly quadrilateral in cross-section and in the depicted embodiment are square in cross-section. These end portions (305) will serve as the housings for the main housing (511) of the load cell (501) and are connected to the auxiliary beams (301) by braces (391) in the depicted embodiment of FIGS. 2-5.

As can be best seen in FIG. 6, each load cell (501) comprises two portions and is generally a strain-gauge load cell of conventional type. Each load cell (501) will commonly be a shear or bending beam type load cell as known to those of ordinary skill in the art. However, in alternative embodiments, single point cells could be used. The main housing (511) of the load cell (501) is of typical design and will serve to house the electronics and other components known to those of ordinary skill in the art. The lever arm (513) (or bending beam) extends from the main housing (511) and will generally be in the shape of a round cylinder with its central axis arranged to extend into said main housing (511). It may have a single diameter or multiple diameters along its length depending on the shape of bushing (523). The lever arm (513) is generally connected to the main housing (511) so that force exerted on the lever arm (513) generally perpendicular to the direction the lever arm (513) extends foam the main housing (511) (generally perpendicular to the axis of the cylinder of the lever arm (513)) can be detected.

Figure 4:
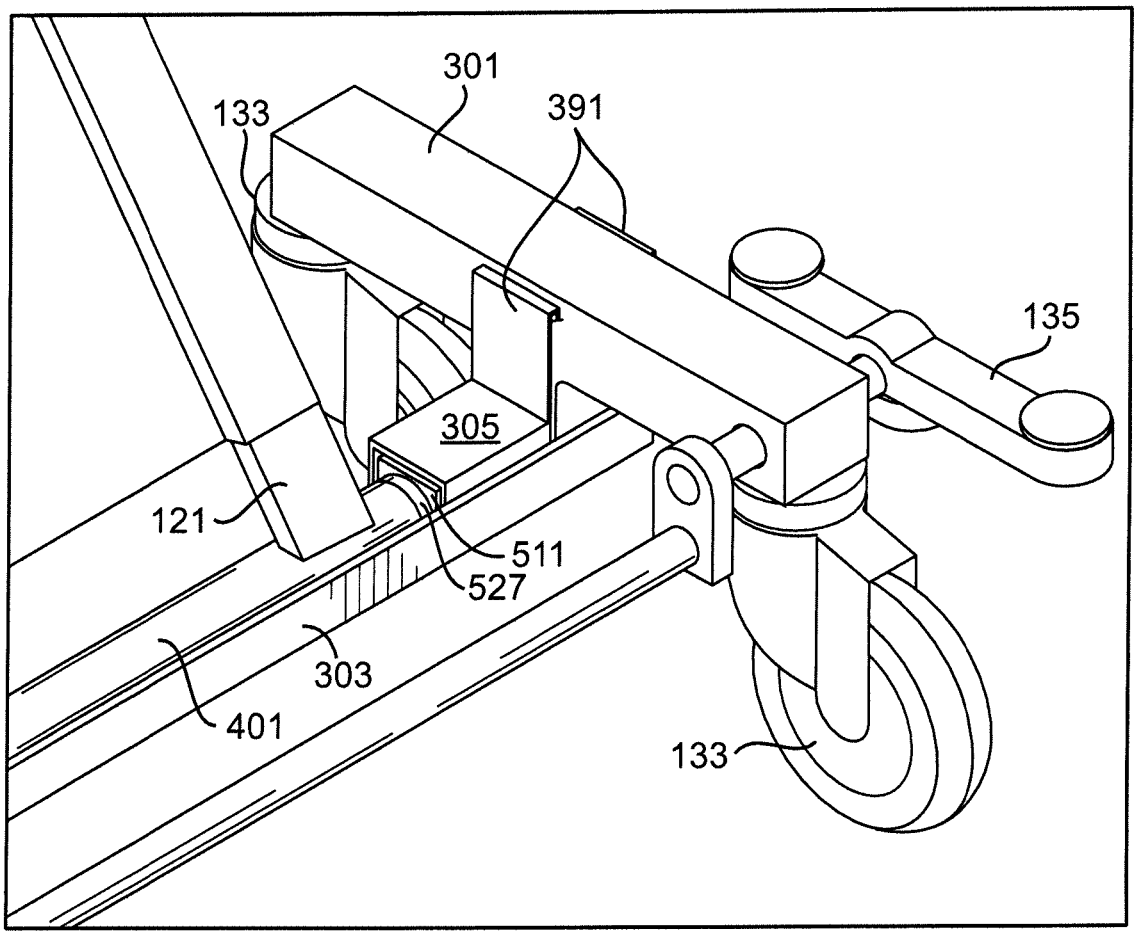
FIG. 4 shows an embodiment of one of the load sensor connections of the adjustable base of FIG. 2. The collar of the bushing and the end of the main housing of the load cell where the lever arm connects are visible.
Figure 5:
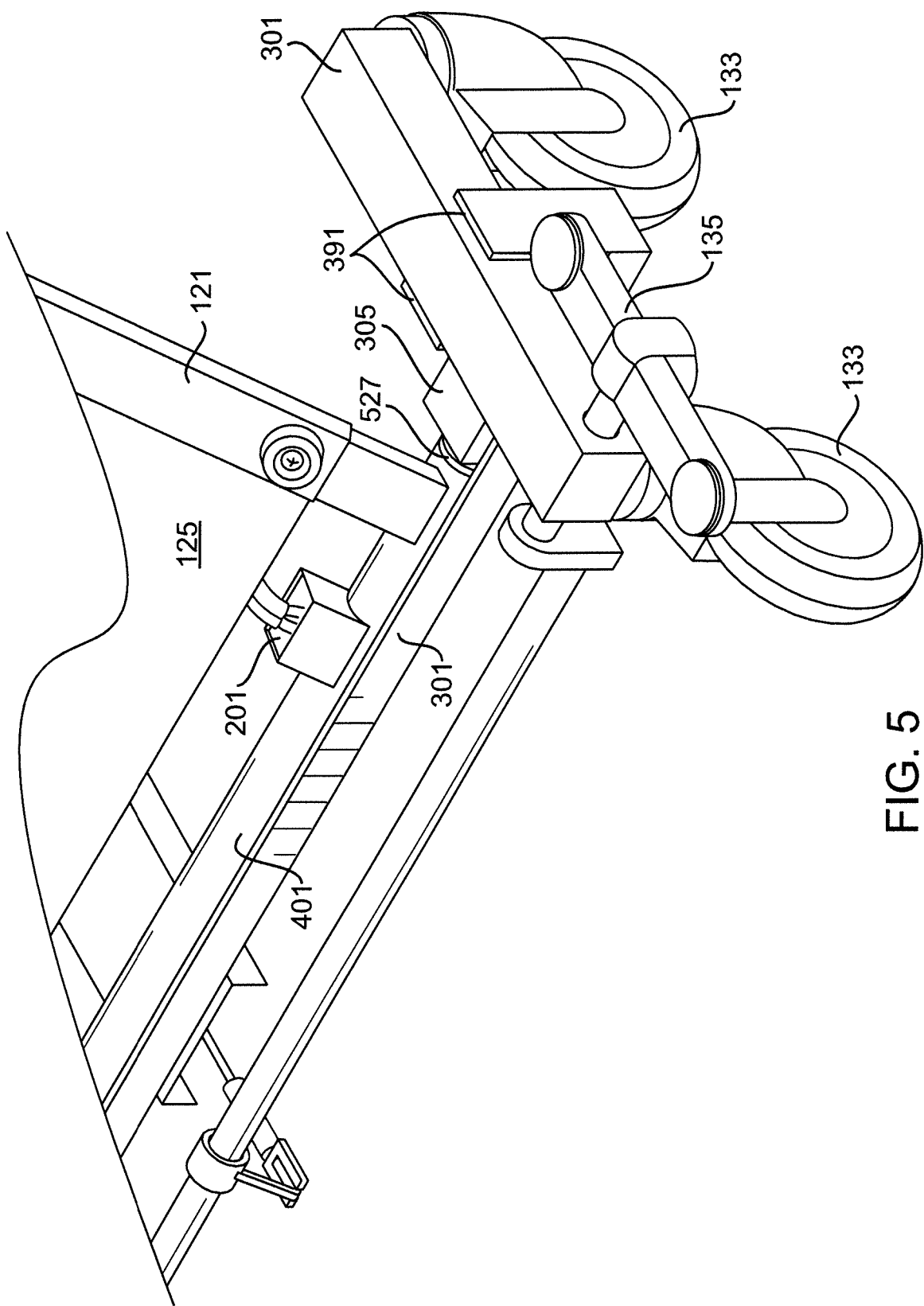
FIG. 5 shows an alternative angle of FIG. 4.

As can be best seen in FIGS. 4, 5, and 7, the main housing (511) is positioned in an end portion (305) of the castor base (131). The lever arm (513) then extends outward and has placed thereon a collared bushing (523). The bushing (523) will generally be rotationally connected to the lever arm (513) and can rotate around the lever arm (513) without twisting the lever arm (513). The outside of the main body (525) of the bushing (523) will generally be placed into the hollow interior of the axle (401) of the lift (125) and rigidly positioned so that the bushing (523) cannot rotate relative to the axle (401). To correctly position the bushing (523), the axle (401) will generally be positioned with an end adjacent to the collar (527). This is most clearly shown in FIGS. 4 and 5. Wiring (529) each the load cell (501) in the same castor base (131) will commonly extend through the axle (401) to the wiring harness (201) for electrical connection to other components including the wiring from the other load cells (501) on the other castor base (131).

As can be best seen in FIGS. 2-5 and 7, each load sensor (200) comprises an independent load cell (501) which is located to determine the weight applied at any floor connection. Namely, at each pair of castor wheels (133) at each corner of the bed (100) by attachment to the opposing ends of the main beam (303). Thus, the mass of any object on the bed frame (101), whose weight will be distributed across the bed frame (101), can be determined from the value of the four sensors (200) regardless of how the bed (100) is adjusted.

In operation, the load cells (501) are able to measure the mass of any object on the bed (100) regardless of the position of the lifts (125) and adjustment of the bed (100). Each load cell (501) will be able to detect the load applied to it by the lift (125) pushing the axle (401) downward. This will then serve to push the lever arm (513) downward creating shear or bend between the lever arm (513) and main body (511). That force can be detected by electronics in the main body (511) and converted into the weight of the object on the bed (100) by comparing the value across all four sensors (200) which should, between them, support all the weight of the object on the bed (100) (as well as components of the bed (100) above them, but those will generally be known and zeroed out).

As should be apparent, having the lever arm (513) be cylindrical allows for the lever arm (513) to be placed in the bushing (523) which is connected to the axle (401). As the bushing (523) can rotate about the lever arm (513), the lift (125) can freely adjust, which causes the axle (401) to rotate, while simultaneously not disconnecting or altering how force is applied to the lever arm (513). Thus, with appropriate control software or hardware, the sensors (200) can determine the mass of any object lying on the bed (100) regardless of the position of the lifts (125) and adjustment of the bed (100).

Throughout this disclosure, relative terms such as "generally," "about," and "approximately" may be used, such as, but not necessarily limited to, with respect to shapes, sizes, dimensions, angles, and distances. One of ordinary skill will understand that, in the context of this disclosure, these terms are used to describe a recognizable attempt to conform a device to the qualified term. By way of example and not limitation, components such as surfaces described as being "generally parallel" will be recognized by one of ordinary skill in the art to not be, in a strict geometric sense, parallel, because, in a real world manufactured item, no surface is generally ever truly planar. A "plane" is a purely geometric construct that does not actually exist, and no component is truly "planer" in the geometric sense. Thus, no two components of a real item are ever truly "parallel", as they exist outside of perfect mathematical or geometric representation. Variations from geometric descriptions are inescapable due to, among other things: manufacturing tolerances resulting in shape variations, defects, and imperfections; non-uniform thermal expansion; design and manufacturing limitations, and natural wear.

There exists for every object a level of magnification at which geometric descriptors no longer apply due to the nature of matter. One of ordinary skill will understand how to apply relative terms such as "generally," "about," and "approximately" to describe a range of variations from the literal meaning of the qualified term in view of these and other considerations as well as that use of such mathematical terms is not intended to mean their strict mathematical relationship, but a general approximation of that relationship in the real world.

Further, use in this description of terms such as "forward" and "backward" do not actually require that certain surfaces or objects be closer or further away from a surface at any given time or to denote a necessary arrangement of components or components relative to a user. Instead, they are generally used to denote opposite directions in conjunction with the standard arrangement of the FIGS. provided herein so as to give relative positioning of elements. Similarly, terms such as "inside" and "outside", "left" and "right", and "top" and "bottom" are used to show relative directions or positions as opposed to absolute location relative any other component or a human user or observer.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A castor base for detecting load, the castor base comprising:
   at least two auxiliary beams, each auxiliary beam supporting at least one castor;
   a load cell mounted to each of said auxiliary beams via a main housing and having a lever arm extending therefrom, wherein a force applied to said lever arm in a direction generally perpendicular to a direction said lever arm extends from said main housing is detected by said load cell;
   a bushing positioned on each of said lever arms to rotate about said lever arm without rotating said lever arm it is positioned on; and
   an axle connected to said bushing so that said axle can rotate relative to said castor base without rotating said lever arms.

2. The base of claim 1 further comprising a main beam interconnecting said auxiliary beams.

3. The base of claim 2 wherein said main beam is of generally "L" shape having two generally perpendicular arms and said axle rotates within said space defined by said two arms.

4. The base of claim 1 wherein each of said auxiliary beams includes two castors, each of said two castors being arranged toward an opposing end of said auxiliary beam.

5. The base of claim 1 wherein wiring from each said load cell extends into said axle.

6. The base of claim 1 wherein said bushings and said lever arms are positioned inside said axle.

7. The base of claim 1 wherein at least one of said lever arms is of generally cylindrical shape.

* * * * *